United States Patent
Burov et al.

(12) 
(10) Patent No.: US 6,239,533 B1
(45) Date of Patent: *May 29, 2001

(54) PIEZOELECTRIC LINEAR STEP MOTOR AND VARIANTS

(75) Inventors: Sergey Vyacheslavovich Burov, Arkhangelsk; Jury Vladimirovich Okatov, Severodvinsk, both of (RU)

(73) Assignee: Samsung Electronics Co., Ltd. (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/011,377

(22) PCT Filed: Jun. 5, 1997

(86) PCT No.: PCT/RU97/00174

§ 371 Date: Feb. 4, 1998

§ 102(e) Date: Feb. 4, 1998

(87) PCT Pub. No.: WO97/47074

PCT Pub. Date: Dec. 11, 1997

(30) Foreign Application Priority Data

Jun. 5, 1996 (RU) .................................................. 96111310

(51) Int. Cl.⁷ .................................................. H01L 41/08
(52) U.S. Cl. ...................................... 310/328; 310/323.02

(58) Field of Search ..................................... 310/323, 328, 310/323.02

(56) References Cited

U.S. PATENT DOCUMENTS

| | | | |
|---|---|---|---|
| 5,043,621 | * 8/1991 | Culp | 310/316 |
| 5,068,566 | * 11/1991 | Culp | 310/328 |
| 5,136,201 | * 8/1992 | Culp | 310/328 |
| 5,144,187 | * 9/1992 | Culp | 310/328 |
| 5,182,484 | * 1/1993 | Culp | 310/328 |
| 5,241,235 | * 8/1993 | Culp | 310/328 |
| 5,273,238 | * 12/1993 | Sato | 244/105 |

FOREIGN PATENT DOCUMENTS

| | | | |
|---|---|---|---|
| 0112454 | * 10/1983 | (EP) | . |
| 0360975 | * 4/1990 | (EP) | . |
| 60-002081 | * 8/1985 | (JP) | . |
| 60-082072 | * 10/1985 | (JP) | . |
| 573828 | * 10/1977 | (SU) | . |
| 738016 | * 5/1980 | (SU) | . |

* cited by examiner

*Primary Examiner*—Elvin Enad
*Assistant Examiner*—Peter Medley
(74) *Attorney, Agent, or Firm*—Piper Marbury Rudnick & Wolfe

(57) ABSTRACT

A piezoelectric linear stepping motor comprises a housing (1), a movable part (4); between them there are provided fixing units made in the form of two piezoelectric units: a shifting-and-fixing unit (2) and a fixing unit (3) which consist of piezoelectric cells (7,8,9), insulators (5) and friction elements (6), the movable part (4) being in contact with the friction elements (6).

8 Claims, 2 Drawing Sheets

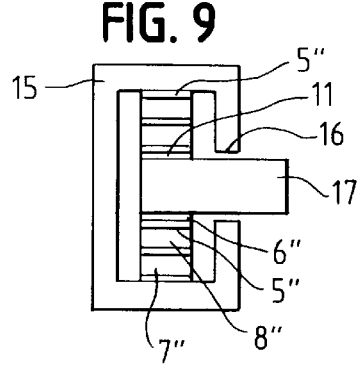
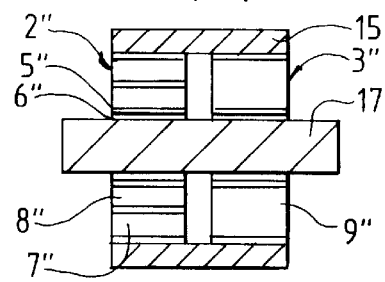
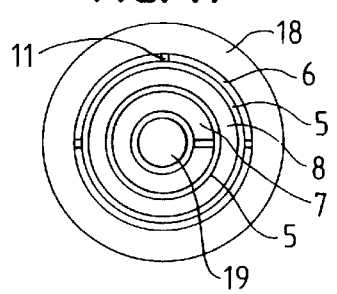
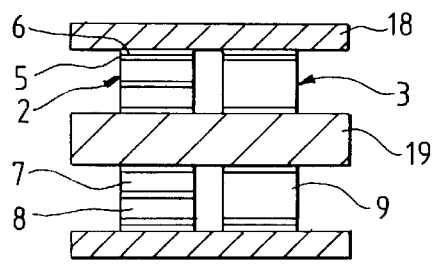
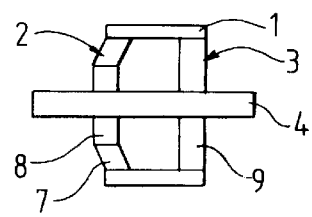
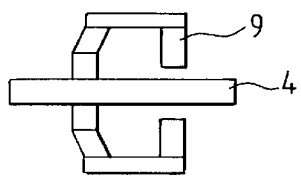
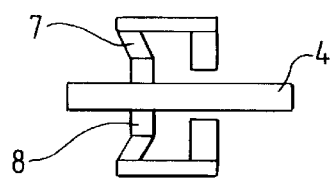
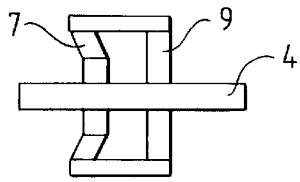
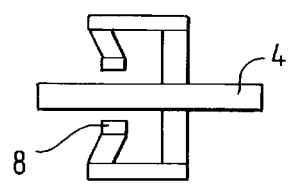
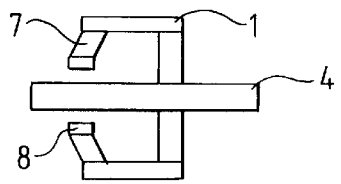

PIEZOELECTRIC LINEAR STEP MOTOR AND VARIANTS

TECHNICAL FIELD

The present invention relates to the field of electric motor manufacture and, more particularly, the invention relates to piezoelectric stepping motors.

BACKGROUND OF THE INVENTION

Known in the art is a linear motor comprising a guide, a housing and a mover in the form of plates secured at an angle in the housing and frictionally interacting with a guide element (SU, A, 801149).

However, this linear stepping motor has large overall dimensions and mass and performs the movement with the help of elastic plates thereby it is impossible to obtain high forces and to provide positioning accuracy.

Also known in the art is a piezoelectric linear stepping motor comprising a housing having of fixing units secured in it and a movable part with a working member (SU, A, 720576).

However, this piezoelectric motor has a great number of components, a complicated manufacturing fixing units, and its movable part is liable to an accidental turn in the process of linear displacement.

SUMMARY OF THE INVENTION

The basic object of the present the invention is to create a linear piezoelectric stepping motor which constructive embodiment would make it possible to simplify the design and manufacturing technology, to obtain high forces at small dimensions and mass and to increase the positioning accuracy.

This object is achieved by providing a piezoelectric linear stepping motor comprising a housing having fixing units secured therein and a movable part; in which motor, according to the invention, the fixing units comprise at least two piezoelectric units disposed one behind the other in a longitudinal or a transverse plane; the first piezoelectric unit being made of a shifting and fixing piezoelectric cells, a split friction element separated by insulators, the second piezoelectric unit is made of a fixing piezoelectric cell, a split friction element and insulators, the movable part being arranged along the motor axis and in contact with the split movable elements.

The piezoelectric units located in the transversal plane may have a form of sectors.

The housing may have a form of a parallelepiped, the piezoelectric units can be made as parallelepipeds disposed one behind the other in the longitudinal plane, and the movable part may be made in the form of a rod having a rectangular cross section.

The housing may also have a form of a polyhedron.

It is desirable for the housing to have a cut-out, through which the movable part goes outside the housing.

It is reasonable for the movable part to have has at least one guide which enters a respective guide on the friction elements.

The motor may have at least two pairs of piezoelectric units disposed in the transversal plane.

The piezoelectric cells may be made in the form of a packet of piezoelectric plates, rings or their sectors which electrodes are connected in parallel alternately, in which case the direction of polarization of each successive piezoelectric plate, ring, or sector is opposite to that of the previous one.

The gaps between the piezoelectric units are preferably filled with an elastic insulating material.

The housing may be movable and the piezoelectric units can be fastened on a stationary bar.

Such design of the claimed motor makes it possible to simplify the construction and manufacturing technology, to obtain high forces at a small size and mass and to increase the positioning accuracy.

BRIEF DESCRIPTION OF THE DRAWINGS

The invention is further described by way of example and the appended drawings, in which:

FIG. 9 is a front view of the fifth embodiment of the motor;

FIG. 10 is a longitudinal section of the motor shown in FIG. 9;

FIG. 11 is a front view of the sixth embodiment of the motor;

FIG. 12 is a longitudinal section of the motor shown in FIG. 10;

FIGS. 13–18 are the working time steps of the piezoelectric linear step motor according to the invention.

THE BEST EMBODIMENTS OF THE INVENTION

Figure 1:
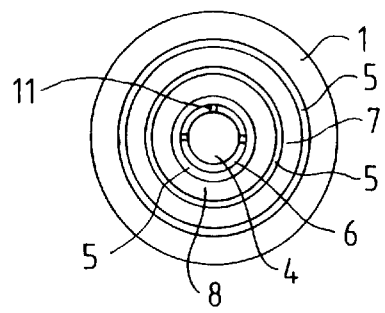
FIG. 1 is a front view of the claimed piezoelectric linear stepping motor (first embodiment)
Figure 2:
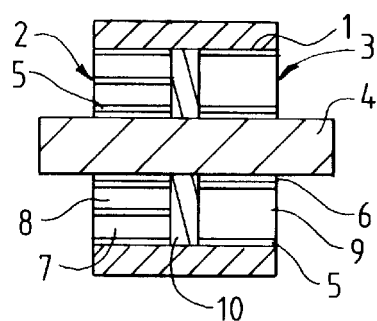
FIG. 2 is a longitudinal section of the motor shown in FIG. 1.

The piezoelectric linear stepping motor according to the invention comprises a cylindrical housing 1 (FIG. 1) in which two piezoelectric units 2 (FIG. 2) and 3 are disposed, and a movable part 4 in the form of a cylindrical rod. Each piezoelectric unit 2 and 3 is rigidly secured to the internal surface of the cylindrical housing 1. The piezoelectric units 2 and 3, by their functions, are divided, respectively, into a piezoelectric shifting-and-fixing unit 2 and a piezoelectric fixing unit 3.

The shifting and fixing piezoelectric unit 2 consists of insulators 5, a split friction element 6, and interconnected (for example, glued) piezoelectric cells 7 and 8. The piezoelectric cell 7 is a shifting one and the vector of its initial polarization is directed at an angle to the longitudinal axis of the motor. The piezoelectric cell 8 is a fixing one, the vector of its initial polarization is directed perpendicularly to the longitudinal axis of the motor.

The fixing piezoelectric unit 3 consists of a fixing piezoelectric cell 9, insulators 5 and a split friction element 6.

Each piezoelectric cell has the electrodes connected to wires (not shown in the drawing).

The gaps between the piezoelectric units 2 and 3 are filled with an elastic insulating material 10.

On the surface of the movable part 4 (FIG. 1) a guide 11 is made entering the corresponding guide on the friction elements 6. The presence of the guide 11 excludes the possibility for the cylindrical rod to turn. The application of the split friction elements 6 ensures tighter clamping of the movable part 4 by the piezoelectric units 2 and 3.

Other embodiments of the claimed piezoelectric linear stepping motor are possible. Characters 2'–9', 2"–9", and 2'''–9''', respectively, represent parts analogous to those represented by characters 2–9, respectively, of the first embodiment.

Figure 3:
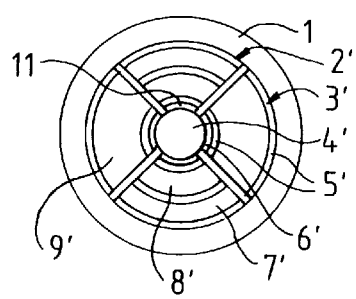
FIG. 3 is a front view of the second embodiment of the motor.
Figure 4:
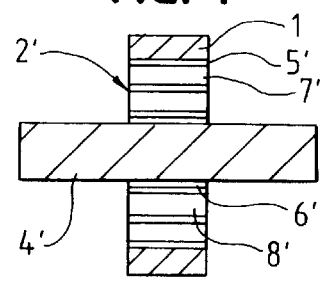
FIG. 4 is a longitudinal section of the motor shown in FIG. 3.

In the second embodiment of the motor shown in FIGS. 3 and 4, in contrast to the first embodiment, piezoelectric units 2 and 3 are disposed in one transversal plane and are made in the form of sectors. This considerably reduces the overall dimensions and mass of the motor.

Figure 5:
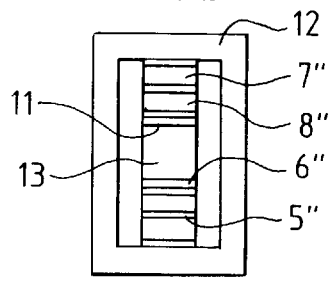
FIG. 5 is a front view of the third embodiment of the motor.
Figure 6:
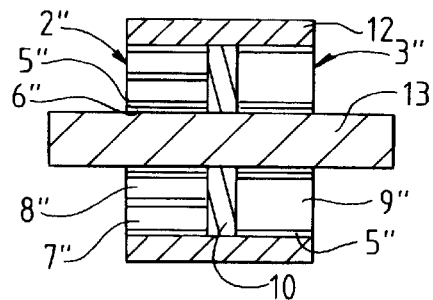
FIG. 6 is a longitudinal section of the motor shown in FIG. 5.

The third embodiment of the motor shown in FIGS. 5 and 6 differs from the first one by the shape of the housing and the movable part and by a simpler construction of the piezoelectric units. The housing 12 has a form of a parallelepiped, and the movable part is made in the form of a rod 13 of a rectangular cross section. Piezoelectric units 2' and 3' are made similarly to the first embodiment and consist of piezoelectric plates, insulators and friction elements.

Figure 7:
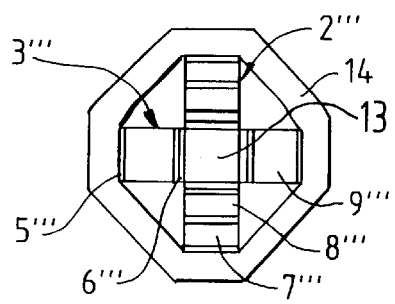
FIG. 7 is a front view of the fourth embodiment of the motor.
Figure 8:
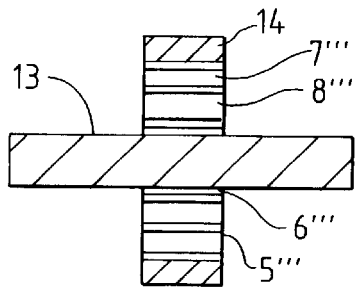
FIG. 8 is a longitudinal section of the motor shown in FIG. 7.

In the fourth embodiment of the motor shown in FIGS. 7 and 8 the housing 14 is made in the form of a polygon while piezoelectric units 2' and 3' are disposed in one transversal plane.

In the fifth embodiment of the motor shown in FIGS. 9 and 10 the housing 15 has an cut-out 16, through which the movable part 17 goes out of the housing. The design of the piezoelectric units is similar to that in the third embodiment.

In the sixth embodiment of the motor shown in FIGS. 11 and 12, and similar to the first embodiment, the movable element is the housing 18 and the stationary member is the bar 19 to which the piezoelectric units 2 and 3 are rigidly secured.

The motor according to the invention operates as follows, using the first embodiment by example.

On applying a positive voltage to the electrodes, the inner part of the shifting piezoelectric cell 7 (FIG. 1), whose polarization vector is directed at an angle to the longitudinal axis of the motor, is displaced leftwards relative to the external part secured on the housing 1 due to the inverse piezoelectric effect. When positive voltage is applied to the fixing piezoelectric cells 8 and 9, they clamp the movable part 4, because the vector of their polarization is directed perpendicularly to the longitudinal axis of the motor. When negative voltage is applied the inner part of the shifting piezoelectric cell 7 is displaced rightwards and the fixing piezoelectric cells 8 and 9 are pushed apart from the movable part.

The working cycle consists of six time steps.

The position corresponding to the first time step is shown in FIG. 13. The positive voltage is applied to all piezoelectric cells. In this case the shifting piezoelectric cell 7 is displaced leftwards and the fixing piezoelectric cells 8 and 9 clamp the movable part 4.

In the second time step the negative voltage is applied to the fixing piezoelectric cell 9 (FIG. 14) and it is pushed apart from the movable part 4.

In third time step the negative voltage is applied to the piezoelectric cell 7 (FIG. 15), and this cell, moving rightwards, displaces the fixing piezoelectric cell 8 and the movable part 4 rightwards for one step.

In the fourth time step the positive voltage is applied to the fixing piezoelectric cell 9 (FIG. 16), and it is pressed to the movable part 4.

In the fifth time step the negative voltage is applied to the fixing piezoelectric cell 8 (FIG. 17), and it is pushed apart the movable part 4.

In the sixth time step the positive voltage is applied to the fixing piezoelectric cell 7 (FIG. 18), and it is displaced leftwards together with the fixing piezoelectric cell 8.

When the cycles are repeated, the movable part 4 performs linear movement to the right.

During the linear movement of the housing the same working cycle is used.

The reversing is effected by changing the sequence in applying the voltage to the fixing piezoelectric cells.

To increase the motor power output, additional piezoelectric units may be installed, which may be disposed both in the transverse and longitudinal planes.

The claimed piezoelectric stepping motor has a simple design and manufacturing technology, small size and mass, a high force on the movable part, and makes it possible to increase the positioning accuracy.

In the description of the embodiments of the invention, for better understanding, a specific narrow terminology is used. However, the invention is not limited by the accepted terms and one should keep in mind that each such term covers all equivalent terms for the units working in a similar manner and used for the solution of the same technical problems.

Although the present invention is described in connection with preferable type of its realizations, it is clear that changes and modifications may be made without deviation from the idea and scope of the invention and those skilled in the art may easily understand that.

These changes and modifications are considered not extending beyond the essences and scope of the invention and the appended claims.

INDUSTRIAL APPLICABILITY

The invention can be used as a slave mechanism in electrical engineering, radio engineering and automation.

What is claimed is:

1. A piezoelectric linear stepping motor comprising:
   a) a housing having an inner surface;
   b) first and second cylindrical, hollow piezoelectric units attached to the inner surface of the housing, each of the piezoelectric units being in separate transverse planes, the first piezoelectric unit having a cylindrical shifting piezoelectric cell, a cylindrical fixing piezoelectric cell attached to the shifting piezoelectric cell, and a friction member attached to the fixing piezoelectric cell, the second piezoelectric unit having a cylindrical fixing piezoelectric cell, and a friction member attached to the fixing piezoelectric cell; and
   c) a shaft, which frictionally interacts with at least one friction member, the shifting and fixing cells of the first piezoelectric unit and the fixing cells of the second piezoelectric unit being configured to operate sequentially in order to linearly move the shaft.

2. A piezoelectric linear stepping motor, comprising:
   a) a housing having an inner surface;
   b) first and second sets of piezoelectric sectors attached to the inner surface of the housing, each of the first set of piezoelectric sectors having a shifting piezoelectric cell, a fixing piezoelectric cell attached to the shifting piezoelectric cell, and a friction member attached to the fixing piezoelectric cell, each of the second set of piezoelectric sectors having a fixing piezoelectric cell and a friction member attached to the fixing piezoelectric cell; and c) a movable shaft, which frictionally interacts with at least one friction member, the shifting and fixing piezoelectric cells of the first set of piezoelectric sectors and the fixing cell of the second set of piezoelectric sectors being configured to operate sequentially in order to linearly move the shaft.

3. The motor of claim 2, wherein the fixing piezoelectric cells are disposed in the first set of piezoelectric sectors between the shifting piezoelectric cells and the shaft.

4. The motor of claim 3, further comprising an insulating material disposed between and separating the piezoelectric sectors.

5. The motor of claim 3, wherein the shaft has at least one guide, and wherein at least one friction member has a guide configured to frictionally interact with at least one of the shaft guides.

6. In a linear piezoelectric stepping motor having a longitudinal axis, a shaft, a fixing-shifting piezoelectric unit, and a fixing piezoelectric unit, a method of moving the shaft in a linear direction, comprising the steps of:

a) frictionally engaging the shaft with the fixing-shifting piezoelectric unit and the fixing piezoelectric unit;

b) releasing the shaft with the fixing piezoelectric unit, while the fixing-shifting piezoelectric unit remains frictionally engaged to the shaft;

c) shifting the fixing-shifting piezoelectric unit in a linear direction, thereby moving the shaft in the linear direction;

d) frictionally engaging the shaft with the fixing piezoelectric unit;

e) releasing the shaft with the fixing-shifting piezoelectric unit, while the fixing piezoelectric unit remains frictionally engaged to the shaft; and f) linearly shifting the fixing-shifting piezoelectric unit in a linear direction opposite to the linear direction shifted in c); and g) repeating steps a) through f) to move the shaft in the linear direction shifted in c).

7. The method of claim 6, wherein the fixing-shifting piezoelectric unit comprises a set of fixing-shifting piezoelectric sectors, and wherein the fixing piezoelectric unit comprises a set of fixing piezoelectric sectors.

8. The method of claim 6, wherein the fixing-shifting piezoelectric unit comprises a cylindrical fixing piezoelectric cell and a shifting piezoelectric cell attached to the cylindrical piezoelectric cell, and wherein the fixing piezoelectric unit comprises a cylindrical fixing piezoelectric cell disposed in a different transverse plane than the fixing-shifting piezoelectric unit.

* * * * *